Nov. 11, 1969 K. F. SPOREK 3,478,205
IONIZATION DETECTOR ELECTRODE ASSEMBLY AND METHOD
OF ANALYZING GAS AND VAPOR SUBSTANCES
Filed July 29, 1965 3 Sheets-Sheet 1
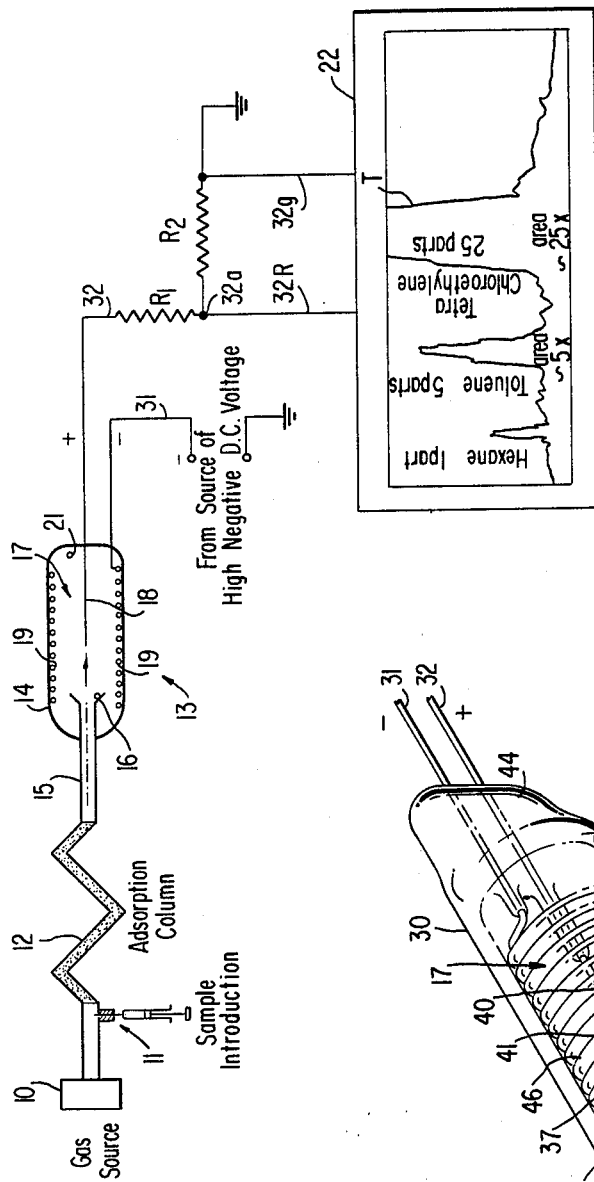
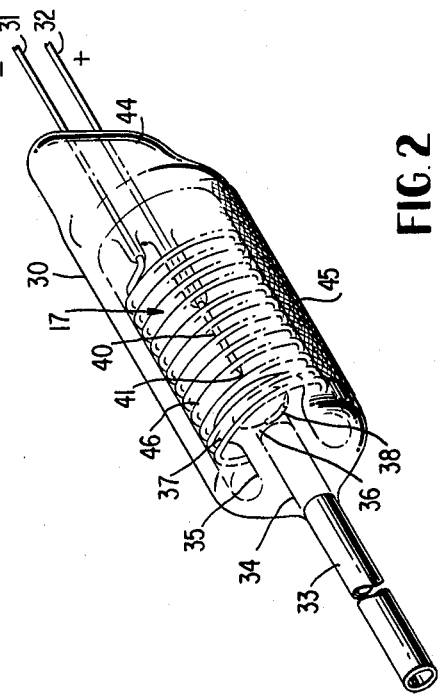
INVENTOR.
KAREL F. SPOREK
BY
W. A. Schaich and Clara N. White
ATTORNEYS Nov. 11, 1969  K. F. SPOREK  3,478,205
IONIZATION DETECTOR ELECTRODE ASSEMBLY AND METHOD
OF ANALYZING GAS AND VAPOR SUBSTANCES
Filed July 29, 1965  3 Sheets-Sheet 2
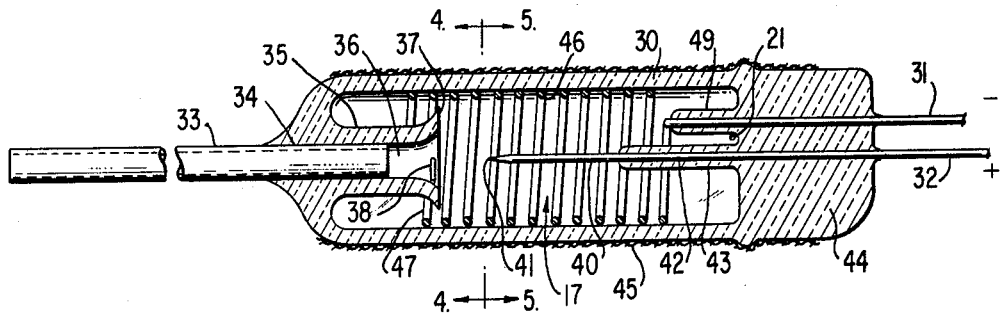
FIG. 3
FIG. 4  FIG. 5
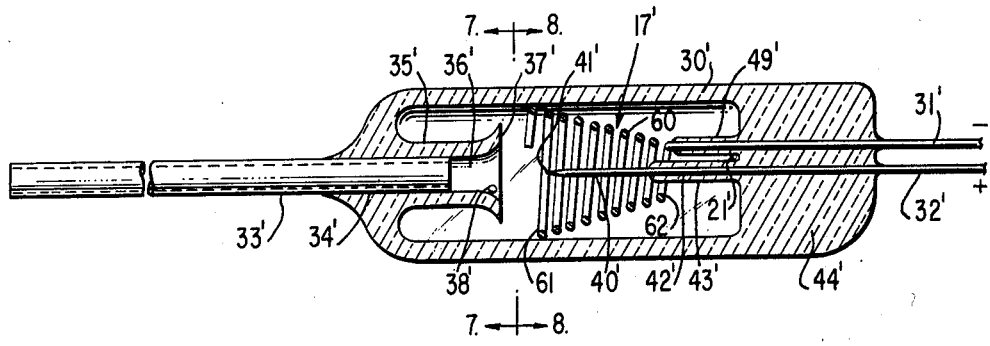
FIG. 6
INVENTOR.
KAREL F. SPOREK
BY
W. A. Schaich and Clason N. White
ATTORNEYS FIG.7
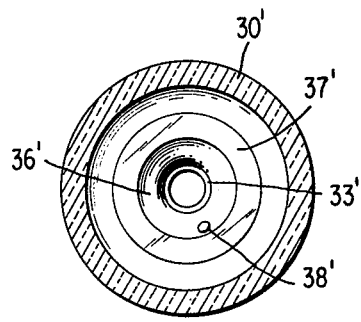
FIG.8
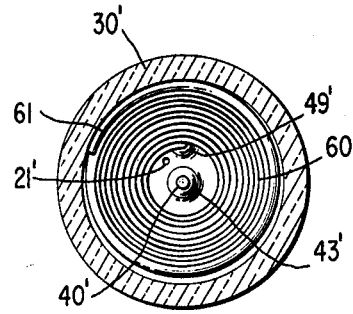
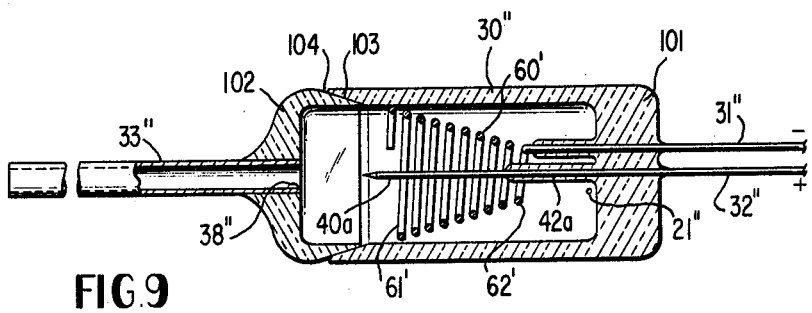
FIG.9
FIG.10
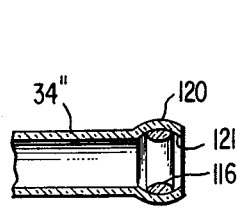
FIG.11
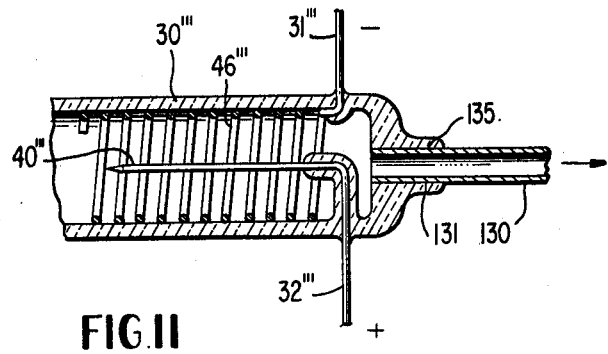

United States Patent Office 3,478,205
Patented Nov. 11, 1969

3,478,205
IONIZATION DETECTOR ELECTRODE ASSEMBLY AND METHOD OF ANALYZING GAS AND VAPOR SUBSTANCES
Karel F. Sporek, Toledo, Ohio, assignor to Owens-Illinois, Inc., a corporation of Ohio
Continuation-in-part of application Ser. No. 375,517, June 16, 1964. This application July 29, 1965, Ser. No. 477,084
Int. Cl. G01n 21/26; G21h 5/00
U.S. Cl. 250—43.5    24 Claims

ABSTRACT OF THE DISCLOSURE

Ionization detector and method of analyzing gas and vapor substances which utilizes a low power source of ionizing radiations, eliminating heavy shielding; an improved detector electrode assembly in a glass or other non-conductive body, the detector having an inlet at one end and an outlet at the other end with a central ion collecting electrode with a low level radioactive source (promethium 147) adjacent the inlet and away from the electrode assembly to subject the gas to be examined to radiation. Argon and helium gases are examples of noble carrier gases disclosed, and in the case of helium gas the detector operates as an electron capture detector. Consult the specification for other features and details.

---

The present invention relates to gas and vapor analyzing methods and apparatus, and more particularly to improved ionization detectors and method of utilizing the same. This application is a continuation-in-part of my application Ser. No. 375,517, field June 16, 1964, now abandoned.

Gas chromatography has developed at a very rapid rate in recent years with various and sundry improvements in gas chromatographic apparatus being devised. Background material of these developments can be found in the book "Gas Chromatography" by J. H. Knox in the series of Methuen's Monographs on Chemical Subjects, 1962 edition, which gives the general theory of gas chromatography and a survey of apparatus pertaining thereto. Particular reference is made to the detection apparatus described therein including katharometers, flame temperature detectors, gas density balances, and ionization detectors.

Extant ionization detectors utilize a source of ionizing radiation which possesses a high energy level. In argon ionization detectors this high energy source is required to assure an abundant supply of free electrons for the excitation of the carrier gas (argon) to the excitation level and ionization of the sample thereby. Electrons liberated by the excited argon gas are accelerated by a powerful electric field to excite further argon atoms. The acceleration of free electrons across the detector effects a branching chain reaction and ionization of the sample (the term "sample" as used herein refers to the substance effluent being analyzed) which may be gaseous, vapor, or a combination thereof, and in connection with the method disclosed herein, may be organic or inorganic.

These detector assemblies and techniques are expensive and require the use of excessively large amounts of high energy radiation sources which are hazardous and very dangerous to use. Large and bulky metallic chambers have been fabricated to assure safety to operating personnel, who have to be trained in the handling of hazardous radioactive materials. The geometry of known detectors is such that the radioactive source material must usually be in a position where arcing between electrodes may erode the source material, thus increasing the operating hazards. The radioactive source required of these devices, usually in the form of thin gold or silver alloy foil, may contain 20–50 microcuries of an alpha emitter (radium or radium-D) or, more usually, 10–50 millicuries of a beta emitter (promethium 147, strontium 90, tritium, krypton 85, etc.). In general, in the prior art devices, whatever the source is, it must be powerful enough to give a background electron current of about $10^{-8}$ amperes.

Objects of the present invention are to provide an improved ionization detector; a low cost ionization detector for gas chromatographic apparatus utilizing a source of ionizing radiation which is easily handled and not dangerous; an improved detecting electrode assembly; an overall geometry of the detector which lends itself to high sensitivity and linearity and ease of fabrication; for elimination of bulky and expensive shielding; a detector in which all surfaces exposed to the flowing gas, except the metal electrodes, are glass or ceramic, an ionization detector which has a low erosion factor; an improved method of gas and vapor analysis to detect organic or inorganic substances and wherein the ionization detector is operated in an electron capture method of gas and vapor analysis.

The ionization detector of the present invention comprises a container or body having walls of an electrically non-conductive material, such as glass, glass-ceramic and ceramic, and having means forming an inlet passage at one end of the container and axially parallel to the longitudinal axis of the glass body. The detector further includes a central ion collecting electrode which extends through the container at the end opposite to the inlet passage by a glass supporting structure so as to be coaxially centered and aligned with the axis of the inlet passage so that gases and vapors flowing through the inlet passage are directed toward and contact within the container the free or unsupported end of the collecting electrode. An annular second electrode is concentrically and symmetrically disposed in the container about the collecting wire electrode and, in its preferred form, is a wire helix and especially preferred is a straight helical or cylindrical helical wire electrode. Gases and effluent from a chromatographic separation column exit from the chamber of the container through an outlet vent or passage in the wall adjacent the locations through which the electrodes extend through the wall. Preferably, a low level radioactive source is positioned adjacent the inlet passage so as to subject a sample eductable into the container to radiations.

A further feature of novelty of my invention resides in the ion current detecting electrode assembly which is not in physical contact with the radioactive source. The tip of the collecting or signal electrode, which is a fine, self-sustaining wire, is preferably sharpened to a point and, preferably, is spaced downstream of the upstream end of a helical electrode concentrically spaced thereabout and axially aligned with the gas input tube. Thus, the high voltage between the helical electrode and the central electrode (which is positive relative to the outer electrode) has a voltage flux distribution which focuses the ions of interest onto the collecting or signal electrode.

The radioactive source is embodied in a form particularly adapted for use with the present invention and constitutes in itself a feature of novelty. The radioactive source is in the form of glass which effects ionization of mixture of the sample and carrier gas. In the preferred embodiment, promethium 147 is encased in a small glass bead which is resistant to chemical action, has a low erosion factor at high temperatures and sufficient quantities (10 microcuries) can be used without a license from the Atomic Energy Commission. Moreover, when the glass body of the detector is transparent, the glass carrying the radioactive source may include a colorant which serves as an optical indicator of the continued presence of the source in the detector. Thus, except for the ion current measuring electrodes, hard, inorganic, non-conducting and nonmetallic surfaces are presented to the carrier gas and sample.

Argon and helium gases may be used as the carrier gas. However, when commercial helium gas is used, the detector described in the immediately preceding paragraphs operates as an electron capture detector. Thus, when only helium gas is flowing along the linear path established by the detector, a high background current is established when only helium was passing through it. When a small quantity of any other gas or vapor is injected into the helium stream, the high background current is reduced proportionately within certain limits to the concentration of the substance. The detector is extremely sensitive to all organic and inorganic substances, permanent gases and noble gases and the voltage produced at the signal electrode is sufficiently high to use the detector without an amplifier. The detector is able to provide a satisfactory signal with just one microliter of air and it is insensitive to moderate changes of helium gas flow and temperature. While satisfactory results are obtained in the absence of any radioactive source, it is preferred that low level source of the type described above be present because the signal output is usually smoother and its rise and fall more gradual in the presence of such radioactive source. In addition, the sensitivity is improved somewhat by the presence of such radioactive source and there is no radiation hazard.

The above and other objects advantages and features of my invention will be further described with reference to the accompanying drawings wherein:

FIG. 1 is a block diagram illustrating gas chromatographic apparatus as my invention applies thereto;

FIG. 2 is an isometric view of an ionization detector constructed in accordance with a preferred embodiment of the invention;

FIG. 3 is a cross-sectional view of the detector illustrated in FIG. 2 taken along the longitudinal axis thereof;

FIG. 4 is a cross-sectional view of FIG. 3 taken in the direction of the arrows 4—4;

FIG. 5 is a cross-sectional view of FIG. 3 looking in the direction of the arrows 5—5;

FIG. 6 is a cross-sectional view of a preferred modified construction of the embodiment of FIG. 2, and FIGS. 7 and 8 are cross-sectional views taken along lines 7—7 and 8—8, respectively, of FIG. 6; and FIGS. 9, 10 and 11 show modifications of the preferred embodiment of the invention.

Referring now to FIG. 1, a typical assemblage may comprise a source 10 of noble gas, which serves as a carrier gas in the functioning of the apparatus. Gas source 10 may comprising a simple storage bottle which is readily obtainable commercially and is a chemically pure version of the gas since impurities in the gas carrier affect the operation of the device. The sample to be analyzed may be injected into the stream of a carrier gas by means of a microsyringe 11. Various other sample injection systems useable with the invention are referred to in "Gas Chromatography," Knox, supra. It is important that the volume of the sample be small and that it be injected almost instantaneously into the system. The gas carrier during the injection is flowing. It will be appreciated that the sample injection device shown at 11 is merely diagrammatic and may be a continuous sampler or any other type for getting the sample into a chromatographic column 12.

The column 12 may be of a packed or capillary type and is preferably of the latter type. In general, the principles of the present invention may be applied to detectors for use with any type of separating column. The column itself may be made of glass, metal or plastic tubing in various lengths. As a specific example, the chromatographic column described and illustrated in Lovelock Patent 3,046,496, and the various chromatographic column types described in chapter 3 of Knox's book on "Gas Chromatography," may be adapted for use with the present invention. All that is essential is that the sample be separated into its various constituent parts by the column and delivered up as effluent in the carrier gas in timed sequence and that the column be efficient.

The output from the chromatographic column 12 is delivered to an ionization detector illustrated generally at 13 including a glass body housing 14, an inlet passage 15 coupled to the chromatographic column 12, a low level radioactive radiation source 16 on the inlet passage. Spaced from the radiation source is an electrode assembly 17 which includes a central straight wire collecting electrode 18 (signal electrode) and an outer electrode 19. Gas inducted into the body 14 of the detector is educted through vent hole 21 to atmosphere or to a disposal means not here pertinent. The electrode assembly 17 is coupled to apparatus 22 which includes a conventional high voltage supply and a recorder for recording or displaying the signal derived from current flowing between the electrodes 18 and 19, which is a direct measure of the ionization of the sample effluent. In the disclosed embodiment, source 16 is a beta source and the central electrode 18 is positive relative to the electrode 19 and is axially aligned with input passage 15.

Detectors constructed as disclosed herein have such high sensitivity that the voltage difference developed between the signal electrode and ground may be applied directly to a commericial recorder after attenuation thereof to within the signal input range of the recorder. Thus, the outer electrode 19 has applied thereto a high negative potential (relative to ground) while the signal electrode 18 is connected to ground through voltage divider resistors $R_1$ and $R_2$ so that the signal electrode is positive relative to outer electrode 19. The signal input lead 32R to recorder 22 is connected to an intermediate point of the voltage divider. (Exemplary circuit parameters for a recorder having a 0–1 millivolt full scale sensitivity and a detector described later herein are $R_1$ about 500 megohm; $R_2$ about 50,000 ohms and a negative high voltage on the outer electrode 19 of about 1500 volts. Resistors $R_1$ and $R_2$ may be portions of a potentiometer with the wiper thereof connected to a recorder.) Such an arrangement avoids the use of a high quality amplifier but it is not intended to imply that an amplifier may not be used to amplify the output of the detector. Thus, the output of the detector may be taken directly from lead 32 and applied to conventional electrometer apparatus (not shown).

When the carrier gas is argon, the substance being analyzed is itself, ionized with, it is believed, the argon gas serving as the mechanism for ionizing the substance. However, the detector constructed with the principles of the present invention have been found to have particular suitability as an electron capture detector when the carrier gas is commercial helium gas. Under this condition of operation, the detector produces a high background current when only helium gas is passing through it and a small quantity of any other vapor or gas is added or injected into the helium causes suppression of this ionization current. Thus, in contrast to when argon is the carrier gas, both organic and inorganic substances which will suppress the ionization of helium gas can be detected.

However, it has been found that not all gases can be used as a carrier gas with the detector disclosed herein. For example, nitrogen gas cannot be used in an ionization detector of the type disclosed herein because nitrogen will not ionize and will not cause ionization of other substances. Nitrogen gas has been used as a carrier gas with a detector of the type disclosed herein but not appreciable ionization effect was observed. Moreover, nitrogen, itself, will not ionize in the presence of argon (which itself remains non-ionized) and will strongly suppress the ionization of helium. This latter phenomenon is utilized in the detector of the present invention when the carrier gas is helium to detect the presence of nitrogen (also oxygen, argon, hydrogen, and carbon dioxide gas). In fact, when the carrier gas is helium, and a detector is as disclosed herein, 0.2 microgram of nitrogen in the helium stream can be detected.

FIGS. 3, 4 and 5, taken collectively, show the details of the actual detector 13 diagrammatically illustrated in FIG. 7 which is a preferred embodiment of the invention. The body 30 of the detector is formed of glass which, preferably, is optically transparent for reasons to be described more fully hereinafter, having a composition selected to match the expansion characteristics of the wire leads 31 and 32. An input tube 33 which connects directly with chromatographic column 12 may be formed integrally with the glass body 30 and of the same material or may comprise a metal tube having expansion characteristics matching the glass body 30. The metal members (tube 33 and electrodes 40 and 46) may be formed of a sealing alloy known as Kovar, as well as other well known sealing alloys, and the glass is selected to have temperature characteristics matching that of the metal and vice versa.

The input tubing 33 is sealed to the glass body at 34 in a conventional manner and the passage in tube 33 connects with flared tube 35 having a passageway 36 connecting with a flared end 37. A radioactive source 38 is bonded and sealingly fused onto the flared end 37.

Passageway 36 in tube 35 directs the carrier gas and sample through the field of radiation established by radioactive source 38 and subjects the carrier and the sample to corpuscular radiation from the radioactive source 38. In the preferred form of the invention, the radioactive source 38 is a source of beta particles from a radioactive isotope such as promethium 147, which is encased in glass matrix but which encasement allows the treatment of the carrier gas and sample thereby.

The electrode assemblies and tube geometry described later herein permits satisfactory detection of organic gases and vapors without the presence of any radioactive material or with a gamma radiation emitter, as for example cobalt-60, and when the carrier gas is helium, the detector is extremely sensitive to inorganic substances as well as permanent gases, noble gases and water. The presence of the radioactive source effects a slight increase in sensitivity and smoother rise and drop of the signal currents and is therefore preferred where there are no objections to its presence for other reasons. Owing to the penetrating ability of gamma radiation, such sources can be used externally in respect to the electrode system of the detector and can therefore be completely isolated from the effects of sample materials and the high voltage. Thus, under some circumstances, source 38 may be completely eliminated or, alternatively, a gamma radiation source positioned externally of the detector body 34 may be used to treat the substances with corpuscular radiation.

The electrode assembly

A central collecting electrode 40 is axially aligned with the input passageway 36 and the tip end 41 of the electrode is sharpened. The downstream end 42 of the collecting electrode 40 is insulatingly supported and centered in the tube by glass insulator 43 which is integral with the flanged base member 44 to thus support and axially align the electrode 40 with the axial center of flanged tube 35. A helical electrode 46 is concentrically and symmetrically disposed about the collecting electrode 40 with the upstream end 47 spaced from and extending slightly beyond the flanged member 37 on inlet passage 36. The end 48 of helical electrode 40 is secured concentrically about the end 42 of collecting electrode 46 by an insulating support 49 which is likewise formed on the base member 44 of the glass body. The axial center of the end 48 of the helix coincides with the axis of electrode 40 and this relationship is maintained by the glass supporting members 49 and 43, respectively, and the inner wall of body member 30. Thus, the smallest distance between straight wire electrode 40 and helical electrode 46 is fixed to establish the lowest arcing voltage of the electrode assembly 17. It should be noted that the glass supporting and centering structure 43 for collecting electrode 40 extends beyond the end 46a of helical electrode 46 leading to glass member 49.

Preferably, each electrode is made from Kovar metal which, like the Kovar metal of tube 33, has expansion and contraction characteristics of the glass material forming the base section 40 of glass body 30. Moreover, electrode 40 is made as small in diameter as is possible and yet be self-sustaining and rugged in operation. It is preferred that the tip end 41 of the collecting wire electrode 40 be spaced a few convolutions downstream of the end of the electrode 46. In general, both of these latter mentioned features serve to focus ions onto the collecting electrode 40.

It should also be particularly noted that the radioactive source 38 is spaced from and completely independent of the electrode assembly 17 so that should there be any heating of the electrode assembly or arcing there will be no arc erosion of the radioactive source. In addition, the leads 31 and 32 are integral extensions of the wire electrodes 40 and 46.

The radioactive source

Returning now to the radioactive source 38, one of the most serious drawbacks to the extant devices is the large activity employed. Great care must be taken in the handling of these sources due to the possibility of releasing radioactive gaseous decomposition products and the sources have to be leak tested every six months and their temperature is usually limited.

Most importantly is the great radiation hazard accompanying the use of these devices to personnel. Use of bulky metallic ionization chambers having sufficient thickness to reduce the radiation hazard has been suggested. Moreover, the massive shielding effected by the chamber itself has not proved sufficient and the detectors are also usually encased or shielded by a further housing. Nevertheless, the measureable activity outside of the hazard reducing enclosure assemblies, while reducing the activity to tolerable levels, has not eliminated the problem. The use of low activity radioisotope such as promethium 147, while having been suggested by others (see "Gas Chromatography" by Knox, supra), the amount of the radioactive material required was quite large since prior art devices require a source which generated or set up a large number of free electrons.

Where a radioactive source is used to treat the effluent and carrier gas, the preferred construction comprises a small glass matrix structure containing promethium 147. Remarkable and unexpected results were obtained with the use of as little as .5 microcurie of promethium 147. This radioactive isotope is considered best because it is capable of being incorporated in glass in a form resistant to chemical erosion and corrosion, the simple shielding of its beta radiation, and its low volatility at high temperatures and the fact that up to 10 microcuries can be used without Atomic Energy Commission license. Thus, a source which is one-twentieth of the license-free quantity and which also is almost 1,000 times less active than most other sources ininstruments of this type may be used and remarkable results obtained. The radioactive isotope being encased in a glass or ceramic body with the isotope diffused therethrough is temperature and corrosion resistant. Promethium 147 is a pure beta emitter having an energy of slightly greater than 0.2 m.e.v. and, thus, the beta particles have very short penetration distance and even with a multicurie source the amount of shielding required is no problem. The preferred radioactive source, promethium 147, has a practical half-life of two and one-half years and is commercially available from the Oak Ridge National Laboratories. This radioisotope may be disposed in glass bead form having a colorant, such as cobalt (blue) added thereto. The glass matrix may have a composition corresponding to the glass composition for the body 30 of the detector and is fused to the flange 37 on the inlet end of tube 35. The glass encasing the radioactive source, being of a different color than the glass body 30, serves as an optical indicator of the presence and location of the radioactive source in the detector. (Other beta emitting isotopes are thalium-204, strontium-90, and technetium-99).

The glass body 30 of the detector, as well as glass bead encased source 16, are made of a nonconductive glass or ceramic having relatively high coefficients of expansion and contraction and, except as noted elsewhere herin, are optically transparent. It is not necessary, however, that the glass body be radiation resistant. In fact, in some instances, it is preferred that the body 30 be radiation transparent, particularly to exteriorly originating high energy ionizing particles, so as to supplement or, if of high enough intensity, replace source 38. In actual practice, the source 38, while of a low intensity radiation not measurable exteriorly of the glass body 30, is sufficient to effectuate the purposes of the present invention.

One glass effectively utilized in making detector bodies according to the invention is a borosilicate sealing glass.* The metal of which the electrode assembly is formed is selected to have good current conductivity and temperature coefficient matching the glass so that the electrodes and leads therefor may be integral and a good metal-to-glass seal achieved. As mentioned above, the borosilicate glass used in making the envelope body 30 serves as a matrix for the radioactive source material. This may be done by crushing the glass to a powder and coating the powder with an aqueous solution ($PmCl_3$ in 0.7 N HCl) containing the source material (promethium 147). This is then dried and fired to melt the glass and encase the source material in the glass. Cobalt may be added as a colorant if desired (e.g., 0.05% $Co_3O_4$ added to the melt). If the source (promethium 147) is in oxide form ($Pm_2O_3$) it may be mixed directly with the powdered glass and then the mixture is fired to melt the glass and thus encase the source material in glass.

A close woven fiber glass sheath 45 surrounds the glass envelope 30 and prevents scattering and dispersion of the radioactive source on accidental breaking of the enclosure. Glass bead 38 is large enough that it is not passable through the woven sheath 45.

FIGS. 6, 7 and 8 disclose a modification of the invention wherein the outer electrode is in the form of a conical helix 60 having a large or base end 61 and a small or apex end 62. The collecting wire electrode 40' corresponds to the collecting wire electrode 40 of FIG. 2 and is likewise axially aligned with the axial center of input passage 36'. The apex end 62 is supported by glass support 49' and it is again noted that the glass support 43' extends forwardly of at least the smallest diameter of the conical helix 60 so that in the absence of a sample the lowest arcing voltage would be determined by the next larger diameter of the helix. This serves to center the conical helix electrode 60 about the electrode 40' at the apex end 62. While the tip end 41' of electrode 40' may extend forwardly of base end 61, it is preferred that the tip end 41' of collecting electrode 40' be spaced a few convolutions downstream of base end 61 of electrode 60. In this arrangement, the entire electrode assembly 17' is downstream of the radioactive source 38'.

The leads 31' and 32' are integral extensions of the wire electrode 40' and 60, respectively.

The detectors shown in FIGS. 2 and 6 are so inexpensive that they may be discarded after extended use. The embodiment shown in FIG. 9, however, permits the ionization chamber to be opened for inspection, cleaning and possible replacement of the ratioactive source 38″. Accordingly, the body 30″ is formed in two parts, 101

---
*One such glass has the following composition: $SiO_2$= 64.5%; $B_2O_3$=18.4%; $Al_2O_3$=7.5%; $K_2O$=3.3%; $Na_2O$=2.2%; CaO-MgO=.1%; BaO=2.8%; $Li_2O$=.6%; Cl=.2%; and F=.5%. (Note: Percentages are approximate to nearest decimal point.)

and 102, which are formed with mating ground glass surfaces 103 and 104, respectively. Mating surfaces 103 and 104 are made in accordance with well known laboratory ware ground glass stopper techniques and are sealed in a similar well known fashion. Surfaces 103 and 104 are tapered and, to effect a good seal, they may be coated with a laboratory stopper grease, such as silicone grease, which serves as a sealant and an indicator since the ground surfaces normally become transparent when a good seal is effected. However, it should be noted that an absolutely perfect seal is not necessary. Furthermore, the ground surface 103 may be formed on the body portion 102 and the ground surface 104 may be formed on the body portion 101.

In a further modification, the radioactive source 38″ may be bonded directly to metal tube 33″. In this embodiment the metal tube 33″ is of Kovar metal which has temperature coefficient closely matching the temperature coefficient of the glass body 102 and the glass bead 38″ carrying the radioactive source material. It should be noted that the glass bead 38″ carrying the radioactive source is located in substantially the same position on the input gas passage as in the earlier described embodiment so that the source is independent of the electrodes 40″ and 46″ of the electrode assembly. The mating surfaces 103 and 104 axially align the input gas passage with the straight wire collecting electrode 40″. The end 40a may extend beyond the base end 61' of the conical electrode 60'.

In the fabrication of the electrode asembly (all embodiments) no oxide should be allowed to form on the metal because an oxide coating on the electrode may tend to lessen the efficiency of the apparatus. Although bare electrodes give excellent performance, it may be desirable to gold plate the exposed surfaces of the electrode assembly to avoid formation of oxide or other insulating coating thereon.

An alternative input passage and source support is shown in FIG. 10. The end 120 of input tube 34″ is formed with an interior annular groove 121 in which is bonded a glass carrier 116. Glass carrier 116 has encased therein the beta emitting radioactive source.

According to the modifications shown in FIG. 11, the outer electrode is in the form of a straight helix 46' which does not extend as far upstream as the helix 46 of FIG. 2. The signal electrode 40″ is in axial alignment with the input passage (not shown in FIG. 11) which is formed similar to one of the input passages shown and described elsewhere herein. The gas outlet passage is a metal tube 130 which is sealed to the glass body 30‴ at 131. Tube 130 is made of the same metal as the electrode assembly and input tube 33 (FIG. 2) and sealed to the glass envelope 30‴ at 135 and may lead to a gas disposal means (not shown).

In summary, the invention described herein affords a low cost, highly sensitive ionization detector in which the radiation hazards have been completely or substantially completely eliminated. The radiation source 16 is a low level beta source, preferably promethium 147 in amounts under 10 microcuries, in a glassy hard form. This ensures that the radioactive material is not leached or "dusted" out during use of the device and the glassy material is temperature resistant and has a low volatility at high temperatures. When the carrier gas is helium, the detector operates as an elution capture detector and it detects organic and inorganic substances, and permanent and noble gases.

Although larger more powerful radioactive source materials may be used, it is preferred that the amount used be less than 10 microcuries which is below the licensable level established by the Atomic Energy Commission, thus there is no need to make the normal six-month check presently required by the Atomic Energy Commision and there is no problem of disposal of the radioactive materials. Indeed, the device may be vented to atmosphere without radiation hazard (although the sample may require that steps be taken to prevent contamination of ambient atmosphere). Because of the elimination of the radiation hazard and low cost of the device, it can be used by medical, police, plant control, production control, technicians, without instruction in procedure for handling radioactive materials. With due regard for the hazards involved in all radioactive byproduct materials, the device may be discarded after extended use.

Since the detector body 30 is made of a transparent glass or ceramic material, a colorant added to the glass bead carrying source 16 and electrode assembly are visible exteriorly thereof and serves as a simple optical indicator of the presence of the radioactive source and allows easy visual inspection of the electrodes. Finally, the detector body 30 may be made in two cup-shaped sections having complementary tapered mating ground glass surfaces so that the electrode assembly and source 16 may be cleaned and inspected when the parts are separated. The ground glass surfaces afford a good seal when mated.

Detectors constructed in accordance with the invention have responses which exhibit a high degree of linearity. This means that the area under the graphical trace T (FIG. 1) of the detector output is approximately proportional to the percentage of the particular compound in the sample being evaluated. (The graphical trace T of FIG. 1 was obtained with argon as the carrier gas. Corresponding traces are obtained with helium as the carrier gas.) The sensitivity of the detector is in the "microgram range" which is more than adequate since the "milligram range" is considered adequate for most investigations where the radiation source may be 1,500 times stronger than the source strength in the present invention. (For example, detectors made in accordance with this invention utilizing 6 microcuries of promethium 147 (.2 m.e.v.) as a source were found to have sensitivities equal to or higher than a commercial argon ionization detector having a 10 millicurie strontium-90 source (.6 m.e.v.).)

The detector assemblies described herein are operable at relatively high temperatures. Nevertheless, some glasses conduct electricity at lower temperatures than might be desirable in a given situation and hence where high temperature operation is desired, the glass must be chosen to accommodate the higher temperature. It is known that the borosilicate glass described earlier herein is sufficiently conductive at about 250° C. to thus possibly limit the upper temperature range of a detector utilizing a glass rendered conductive by high temperature.

Possible explanation for increase in efficiency, sensitivity and linearity

It is hypothesized that one of the reasons the above disclosed detector arrangement is better than the prior art devices lies in the geometry of the tube and the orientation of the input passage and radiation source to the electrode assembly 17. The input passage of the detector is axially aligned with the collecting wire electrode 40 (numeral references are to FIG. 3), namely, the positive electrode or anode, and the gas-vapor which is irradiated by the radioactive source 38 flows smoothly and uniformly and direct at the electrode assembly. However, the low level radioactive source 38 is independent of electrode assembly 17 so that any ionization of the gas-vapor in the vicinity of the electrode 40 due to the source acting directly on that gas is lessened. The outer helical electrode 46 (element 60 of FIG. 6) is concentrically disposed about the central wire electrode 40 and is likewise axially aligned with the input passage 36. The tip end 41 of the wire electrode is spaced downstream of the upstream end of the helix 40.

With this electrode arrangement, the greatest voltage flux density occurs at the center electrode (which has a very small surface area) and the least flux density at the outer electrode in the end of the electrode assembly first approached by ions. (In the conical helix 60 (FIG. 6) the voltage gradient is greater at the small end of the conical helix than at the large end thereof). However, the flux lines emanating from the collecting wire electrode form a cone having a focusing effect for negative ions onto the tip of the collecting wire electrode. Inasmuch as the negative ions are the ones of most interest in this arrangement, this is all to the good. As the ions are "shot," so to speak, at the area of largest flux concentration or the highest flux density, all negative ions are attracted more quickly to the collecting electrode 40 due to this focusing effect. A small diameter collecting electrode 40 will have a large surface density of charge and an intense field is set up in the region surrounding it. Negative ions are attracted to the positive wire collecting electrode 40, each such ionized molecule being de-ionized and exiting from the chamber through the vent hole 21. The ions generated by the treatment of the carrier and sample gas by the radioactive source 38 have small chance of recombining before their transit to the signal electrode 40.

The embodiments of my invention, herein particularly shown and described, are intended to be illustrative and not necessarily limitative of my invention since the same are subject to changes and modifications without departure from the scope of the invention as set forth in the accompanying claims.

I claim:

1. A device for inspecting a moving gaseous medium comprising
   a chamber formed of nonconductive vitreous material,
   inlet and outlet means at the ends of said chamber for the induction and education, respectviely, of the gaseous medium,
   a source of ionizing radiation for subjecting the incoming gaseous medium to ionizing radiation, said source comprising a low level radioactive source sealed in the walls of said nonconductive chamber adjacent said inlet means,
   an electrode assembly inside said chamber in the path of the inducted gas for determining the ionization thereof by said source of ionizing radiation,
   said electrode assembly comprising
   a self-supporting straight wire electrode centrally extending along the longitudinal axis of said chamber and in axial alignment with said input passage,
   a helical wire electrode having as the axis thereof said straight wire electrode,
   the inducted gas medium passing through said electrode assembly to said outlet means,
   and a pair of conductors joined to said electrodes and extending exteriorly of said chamber.

2. The device defined in claim 1 wherein said inlet means comprises a tube secured to an end of said nonconductive chamber and extending interiorly thereof, and an annularly shaped interior end formed on said tube for carrying said source and spaced from said electrode assembly,
   the axis of said inlet tube coinciding with the axis of said straight wire electrode and spaced therefrom.

3. The device defined in claim 2 wherein said source comprises
   a beta emitter,
   a small glass member encasing said beta emitter,
       said small glass member being bonded to the inside wall of said tube; and
       said small glass member having temperature coefficients closely matching or identical to the temperature coefficient of which said tube is made.

4. The device defined in claim 1 wherein said helical wire electrode is a straight helix axially aligned with said straight wire electrode and extending for a greater extent upstream relative to the moving gaseous medium than said straight wire electrode.

5. An electrode assembly for an ionization chamber in which a carrier gas and sample are subjected to radiations, said electrode assembly comprising
   a straight wire electrode having a small diameter so that the surface area thereof is small,
      said straight wire electrode being made of a material such that the straight wire electrode is self-supporting when supported at one end,
   a truncated hollow conical electrode having a base end and an apex end,
   means for supporting the apex end of said truncated conical electrode in fixed concentric relation to the supported end of said straight wire electrode,
   and a pair of conductors connected to the supported ends of said electrodes.

6. The electrode assembly defined in claim 5 wherein said truncated conical electrode is a wire wound in the form of a truncated conical helix.

7. The electrode assembly defined in claim 5 wherein the free end of said straight wire electrode is recessed a short distance inwardly from the base of said truncated cone.

8. The electrode assembly defined in claim 5 wherein said truncated conical electrode is a wire wound in the form of a conical helix and wherein the said pair of conductors are integral extensions of said conical helical electrode and said straight wire electrode, respectively.

9. In an ionization detector, an enclosure comprising,
   a first cup-shaped glass member having central inlet passage for a gas carrier and sample,
   a second cup-shaped glass member,
      an electrode assembly carried by said second cup-shaped member,
      including a centrally positioned straight wire electrode and an annular electrode concentrically disposed about said straight wire electrode,
      an outlet passage in said second cup-shaped glass member,
   and tapered complementary mating surfaces formed on the respective lips of said cup-shaped members for sealing the said cup-shaped members when said surfaces are mated, said tapered mating surfaces, when mated, axially aligning said input passageway with said straight wire electrode.

10. An ionization detector as defined in claim 9 including a glass bead bonded to the wall of said inlet passageway of said first cup-shaped member, and
   a beta particle emitting material encased in said glass bead.

11. In an ionization detector for gas chromatographic apparatus,
   a tubular glass enclosure,
   means forming an input passageway at one end of said enclosure,
   a glassy matrix bonded to a wall of said input passageway,
   a source of beta radiation carried in said glassy matrix,
   an electrode assembly including,
      a central straight wire electrode axially aligned with said input passageway and insulatingly supported at said other end,
         the free end of said straight wire electrode being disposed axially a distance from said source of beta radiation,
         said straight wire having a relatively small surface area,
         and a helical wire electrode concentrically disposed about said straight wire electrode,
      means connecting said straight wire electrode to a source of direct current operating potential which is positive relative to the operating potential on said helical wire electrode, and
   means forming an outlet passage in said enclosure at said other end.

12. The ionization detector defined in claim 11 wherein said source of beta radiation is Pm 147 in an amount under 10 microcuries.

13. The ionization detector defined in claim 11 wherein said source of beta radiation is encased in a glassy material,
   said glassy material having a colorant added thereto so that the glass is visible from exteriorly of the said glass enclosure.

14. The ionization detector defined in claim 11 wherein said beta source has a low radiation level so that the radiation level exteriorly of said envelope is negligible, said beta source being encased in a ceramic bead, said ceramic bead being bonded to the inner surface of said input passageway, and
   optical means for determining the presence of said source on said passageway.

15. The ionization detector defined in claim 11 including a source of high negative potential connected to said helical wire electrode, a high impedance voltage divider connected between said straight wire electrode and a point of reference potential, and means for deriving an output signal from an intermediate point on said voltage divider.

16. In an instrument having a radioactive source and a frangible enclosure therefor, a close woven fibrous sleeve surrounding said enclosure to prevent dispersion of the radioactive source on accidental breaking of said enclosure.

17. The device claimed in claim 16 wherein said enclosure is made of glass, and where said sleeve is woven from a fiber glass material, and wherein said radioactive source is encased in a glass bead which is not passable through said woven sleeve.

18. In an instrument having a radioactive source,
   an optically transparent enclosure enclosing the space about said source,
   a colorant,
   and a matrix for holding the radioactive source and colorant so that said colorant indicates the presence or absence and location of said radioactive source in said enclosure.

19. An ionization detector comprising
   a container having walls of an electrically nonconductive transparent glass material,
   means forming an inlet passage at one end of the container and axially parallel to the longitudinal axis of the container,
   a first wire electrode extending through the container at the end opposite the inlet passage and within the container, said first wire electrode being straight and coaxially centered and aligned with the axis of the inlet passage,
   a second wire electrode extending through the container at the opposite end and said second wire electrode having a helical configuration within the container and disposed concentric with respect to said straight wire electrode, said container having an outlet passage in the wall of the container adjacent the location through which said electrodes extend through the container,
   a high direct current voltage source for rendering said straight wire electrode positive relative to said helical wire electrode and establishing between the said electrodes an electrostatic ion focussing field,
   and means indicating current flow through said electrodes.

20. An ionization detector as defined in claim 19 in which the helical wire has the general configuration of a cylinder.

21. An improved method of gas chromatography comprising the steps of
   establishing a substantially constant flow of helium gas along a substantially linear path,
   ionizing the helium gas as it travels along said path, directing the ionized helium gas through a powerful electrostatic field defined by a straight wire electrode in the path of said ionized helium gas and substantially coaxially aligned therewith, and a helical wire electrode in the path of flow of said helium gas and concentrically disposed about said straight wire electrode, said electrodes being positioned downstream of the point where said helium gas is ionized, applying a high potential to said helical wire electrode said potential being negative with respect to said straight wire electrode, measuring the current in said straight wire electrode as the ionized helium gas flow through said electrode system, subsequently injecting a substance to be analyzed into said path for admixing with said helium gas prior to ionization of same;

again measuring the current in said straight wire electrode, and recording the suppression in ionization current of said helium gas.

22. A method of analyzing a sample of a gaseous substance comprising the steps establishing a constant flow of helium gas along a substantially linear path including as a part thereof a non-metallic tubular member, subjecting said helium gas to an ionizing radiation, directing said gas through a powerful electrostatic field coaxially and radially aligned with said nonmetallic tubular member as defined by a straight wire metal electrode and a cylindrically shaped hollow metal electrode member, measuring the curent flowing in said straight wire metal electrode, injecting the sample substance to be analyzed into said helium gas prior to its subjection to said ionizing radiation separating the sample substance into its constituent parts in a chromatographic column, and measuring the difference in current flow in said straight wire metal electrode as the mixture of helium gas and constituent parts of said sample substance move therepast.

23. A method of analyzing a sample of a gaseous substance comprising the steps of establishing a constant flow of a helium gas along a substantially linear path including a nonmetallic tubular member, directing said gas through an intense electrostatic field coaxially aligned with said path and within said nonmetallic tubular member and defined by a straight wire metal electrode member and a cylindrically shaped metal electrode member concentrically disposed about said straight wire metal electrode member, measuring the current flowing in said straight wire electrode as the helium gas flows through said electrostatic field, injecting the sample substance to be analyzed into said helium gas prior to directing the gas through said field, and measuring the difference in current flow in said straight wire electrode as the mixture of helium gas and sample substance flow through said electrostatic field.

24. Apparatus for analyzing gaseous substances comprising a chromatographic column, means for establishing a flowing stream of helium gas through said column, means for injecting the gaseous substance to be analyzed into said stream of helium gas upstream of said column, an electrically nonconductive tubular member connected to said column and defining a linear path for the flowing gas stream and said gaseous substance carried thereby, a straight wire metallic electrode centered coaxially in said gas stream and in said electrically nonconductive tubular member, a helical wire metallic electrode centrically disposed about said straight wire electrode and in said electrically nonconductive tubular member, means upstream of said electrodes and downstream of said column for subjecting said helium gas to ionizing radiation, said ionizing means comprising a low level radioactive source having insufficient strength to penetrate the walls of said tubular member to create any radiation hazzard exteriorly thereof, means for applying a high electrical potential to said electrodes, and means connected to said straight wire electrode for recording the suppression in ionization current of said helium gas.

References Cited

UNITED STATES PATENTS

| | | | |
|---|---|---|---|
| 3,019,360 | 1/1962 | Hees | 324—33 X |
| 3,031,519 | 4/1962 | Silverman. | |
| 3,087,113 | 4/1963 | Foster. | |
| 3,204,103 | 8/1965 | Johnson et al. | 250—84 X |
| 3,230,374 | 1/1966 | Jones et al. | 250—84 X |
| 3,244,990 | 4/1966 | Herb et al. | 324—33 X |

RALPH G. NILSON, Primary Examiner

S. ELBAUM, Assistant Examiner

U.S. Cl. X.R.

73—23; 250—83.6, 106; 313—54, 93; 324—33; 328—251

PO-1050
(5/69)

UNITED STATES PATENT OFFICE
CERTIFICATE OF CORRECTION

Patent No. 3,478,205      Dated November 11, 1969

Inventor(s) Karel F. Sporek

It is certified that error appears in the above-identified patent and that said Letters Patent are hereby corrected as shown below:

Column 3, line 50, "comprising" should be --comprise--.
Column 10, line 33, "education, respectviely," should be
--eduction, respectively,--

SIGNED AND
SEALED
FEB 24 1970

(SEAL)
Attest:

Edward M. Fletcher, Jr.
Attesting Officer

WILLIAM E. SCHUYLER, JR.
Commissioner of Patents